(12) United States Patent
Cottrell (10) Patent No.: US 8,069,110 B2
(45) Date of Patent: *Nov. 29, 2011

(54) SYSTEM AND METHOD FOR FACILITATING TRADING IN AN ELECTRONIC MARKET

(75) Inventor: Stephen Cottrell, London (GB)

(73) Assignee: NYSE Life Administration and Management (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,912

(22) Filed: Feb. 12, 2010

(65) Prior Publication Data

US 2010/0211496 A1 Aug. 19, 2010

Related U.S. Application Data

(63) Continuation-in-part of application No. 11/537,733, filed on Oct. 2, 2006, now Pat. No. 7,689,500.

(51) Int. Cl.
*G06Q 40/00* (2006.01)

(52) U.S. Cl. .............................. 705/37; 705/35

(58) Field of Classification Search ........................ None
See application file for complete search history.

(56) References Cited

OTHER PUBLICATIONS

Search Notes and References from U.S. Appl. No. 11/537,733 now U.S. Patent No. 7,689,500 (not added as attachments; see Application for U.S. Patent No. 7,689,500).*
Quick Reference Guide Trading Eurex Release 6.0, Eurex, Mar. 2003.*
Quick Reference Guide Eurex Market Model, Eurex, Jan. 2007.*
Pro-Rata Matching and the Order Book Dynamics of Fixed Income Futures, Jonathan Field and Jeremy Large, Aug. 30, 2007.*

* cited by examiner

*Primary Examiner* — Olabode Akintola
*Assistant Examiner* — Kellie Campbell
(74) *Attorney, Agent, or Firm* — Katten Muchin Rosenman LLP (57) ABSTRACT

A method and system for facilitating trading of financial instruments in a market are provided. The system comprises a server and an interface. The interface is configured to enable buy orders and sell orders to be entered. Each order has a price, a volume, and an entry time and relates to a respective futures contract. The server is configured to match received buy orders having a first price to received sell orders having the first price. The match is effected by ensuring that the prices match, and then using the volume and entry time for each buy order and each sell order to assign a weight of time relative to volume, and then using the weights to determine each match. The server uses the matches to complete respective trades. The weights may be adjusted based on market conditions.

8 Claims, 6 Drawing Sheets

Wv: 1, Wt: 0 = Pure Volume Pro Rata
Wv: 0, Wt: 1 = Pure Time Pro Rata
Wv: 1, Wt: 1 = Equally Weighted Time and Volume Pro Rata

Fig. 3

Wv: 1, Wt: 0 = Pure Volume Pro Rata
Wv: 0, Wt: 1 = Pure Time Pro Rata
Wv: 1, Wt: 1 = Equally Weighted Time and Volume Pro Rata

SYSTEM AND METHOD FOR FACILITATING TRADING IN AN ELECTRONIC MARKET

CROSS-REFERENCE TO RELATED APPLICATIONS

This application claims priority to U.S. patent application Ser. No. 11/537,733, filed Oct. 2, 2006 (now U.S. Pat. No. 7,689,500, issued Mar. 30, 2010), the entirety of which is incorporated herein by reference.

BACKGROUND OF THE INVENTION

1. Field of the Invention

The present invention relates to the field of financial markets. More particularly, the invention relates to the trading of financial instruments, such as futures contracts, options contracts, forward contracts, or spot contracts, whose underlying assets may include rates, bonds, commodities, currencies, energy, equities, interest rates, or metals.

2. Related Art

Financial markets support trading in multiple financial instruments. The central dynamics of the market in which each instrument operates and trades will depend upon the individual characteristics of the instrument.

All markets which provide a periodic or continuous auction for the matching of buy orders and sell orders through a central order book employ a trading algorithm which prescribes how matching occurs. As markets have adopted electronic trading, in their move from the traditional exchange trading floor to the screen, exchanges have sought to electronically replicate the characteristics present in the trading floor environment. Furthermore, the adoption of electronic trading has enabled and continues to enable further development of such auction-based functionality.

In the exchange-based derivative markets, traders of equity derivative instruments have become accustomed to a time priority algorithm, in which orders of the same price are prioritized for matching according to the time they entered the central order book.

Certain exchange-traded interest rate derivative contracts, such as, in particular, short term interest rate ("STIR") contracts, such as Short Sterling, Euribor and Eurodollar futures, reflect interest rate expectations stretching out several years in periodic, often quarterly, intervals. Interest rate expectations over time may be reflected graphically by what is known as the yield curve. Individual movements along each point of the yield curve can often be subtle, as the market establishes its expectations of future interest rates. As a consequence, the trading algorithm employed when exchange trading moved from floor to screen was designed to extract maximum liquidity from a market with these characteristics. Accordingly, the major STIR markets have employed a volume pro-rata algorithm, which is designed to distribute trading opportunities amongst a greater number of traders, thus encouraging wider participation and henceforth greater levels of liquidity in the market.

As electronic markets have evolved, access has become easier and more cost effective, and contracts which were traded on a single trading floor of one of the London or Chicago exchanges are now available globally through an electronic trading screen. As a result, traders have access to multiple markets through a single screen and are able to seek the most liquid global instruments, given any particular global macro-economic circumstance. In response to this evolution in electronic markets, exchanges have found that the traditional characteristics that originally governed the dynamics of the floor based markets, and their early electronic replacements, also need to evolve. This evolution will ensure that the market maximizes opportunities for as wide a range of market participants as possible, regardless of their respective heritages as traders. In order to remain competitive, exchanges need to be in a position to rapidly respond to evolutions in the marketplace. This includes developing an ability to rapidly adapt the characteristics of the trading algorithm to suit new market dynamics and to accommodate new market participants. Accordingly, the present invention is intended to address this problem.

SUMMARY OF THE INVENTION

In one aspect, the invention provides a system for facilitating trading of futures contracts in a market. The system comprises a server at which futures contracts are actively traded and an interface in communication with the server. The interface is configured to enable at least one of a buy order and a sell order to be entered. Each buy order and each sell order has a price, a volume, and an entry time and relates to a respective futures contract. The server is configured to receive a plurality of buy orders and sell orders from the interface, and to match buy orders relating to a first futures contract and having a first price to sell orders relating to the first futures contract and having the first price. The match is effected by using the volume and entry time for each buy order and each sell order to assign a time weight and a volume weight, and then using the assigned time and volume weights to determine each match. The server is further configured to use each determined match to complete a respective trade.

The system may be further configured to determine each match according to a first algorithm which is expressible as follows:

$$f_n = \frac{w_v \left( \frac{v_n}{\sum_{r=1}^{N} v_r} \right) \times w_t \left( \frac{(N+C)-n}{\sum_{r=1}^{N} r} \right)}{w_v + w_t}$$

In the above equation for the first algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; and $f_n$=a resultant pro-rata factor for the $n^{th}$ buy or sell order. The time offset C may be set equal to 1.

Alternatively, the server may be further configured to determine each match according to a second algorithm which is expressible as follows:

$$f_n = \left( \frac{v_n}{\sum_{r=1}^{N} v_r} \right)^{\frac{w_v}{S}} \times \left( \frac{(N+C)-n}{\sum_{r=1}^{N} r} \right)^{\frac{w_t}{S}}$$

In the above equation for the second algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; S=a smoothing factor; and $f_n$=a resultant pro-rata factor for the $n^{th}$ buy or sell order. The time offset C may be set equal to 1.

Each buy order and each sell order may be assigned at least a third weight value relating to a third characteristic. The server may be further configured to use at least the assigned third weight values in conjunction with the assigned volume weights and the assigned time weights to determine each match. The third characteristic may include an association with a trader, and the third weight value may relate to a preference value associated with the trader.

The server may be further configured to assign the volume weights and the time weights by using observable data relating to the market. The server may also be further configured to adjust at least one of the previously assigned volume weights and the time weights by using observable data relating to the market.

In another aspect, the invention provides a method of trading of futures contracts in a market. The method includes the steps of enabling a plurality of users to enter buy orders and sell orders, each buy order and each sell order having a price, a volume and an entry time and relating to a respective futures contract; assigning a volume weight and a time weight to each buy order relating to a first futures contract and having a first price based on its respective volume and entry time; assigning a volume weight and a time weight to each sell order relating to the first futures contract and having the first price based on its respective volume and entry time; matching buy orders having the first price to sell orders having the first price using the assigned respective volume weights and time weights; and using the matched buy orders and sell orders to complete at least one trade.

The matching step may further include using the assigned respective volume weights and time weights according to a first algorithm which is expressible as follows:

$$f_n = \frac{w_v\left(\frac{v_n}{\sum_{r=1}^{N} v_r}\right) \times w_t\left(\frac{(N+C)-n}{\sum_{r=1}^{N} r}\right)}{w_v + w_t}$$

In the above equation for the first algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; and $f_n$=a resultant pro-rata factor for the $n^{th}$ buy or sell order. The time offset C may be set equal to 1.

Alternatively, the matching step may further include using the assigned respective volume weights and time weights according to a second algorithm which is expressible as follows:

$$f_n = \left(\frac{v_n}{\sum_{r=1}^{N} v_r}\right)^{\frac{w_v}{S}} \times \left(\frac{(N+C)-n}{\sum_{r=1}^{N} r}\right)^{\frac{w_t}{S}}$$

In the above equation for the second algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; S=a smoothing factor; and $f_n$=a resultant pro-rata factor for the $n^{th}$ buy or sell order. The time offset C may be set equal to 1.

The method may further include the step of assigning at least a third weight value to each buy order and to each sell order. The third weight value may relate to a third characteristic. The matching step may further include matching buy orders having the first price to sell orders having the first price using the assigned respective volume weights, time weights, and at least third weight values. The third characteristic may include an association with a trader and the third weight value may relate to a preference value associated with the trader.

The step of assigning the volume weight and the time weight to each buy order may further include assigning the volume weight and the time weight to each buy order by using observable data relating to the market. The method may further include the step of, for at least one buy order, adjusting at least one of the previously assigned volume or time weights by using observable data relating to the market. Similarly, the step of assigning the volume weight and the time weight to each sell order may further include assigning the volume weight and the time weight to each sell order by using observable data relating to the market. The method may further include the step of adjusting at least one of the previously assigned volume or time weights by using observable data relating to the market.

In yet another aspect, the invention provides a system for facilitating trading of financial instruments in a market. The system comprises a server at which financial instruments are traded and an interface in communication with the server. The interface is configured to receive entry of at least one of a buy order and a sell order. Each buy order and each sell order has a price, a volume, and an entry time and relating to a respective financial instrument. The server is configured to receive a plurality of buy orders and sell orders from the interface, and to match buy orders relating to a first financial instrument and having a first price to sell orders relating to the first financial instrument and having the first price by, for each buy order and each sell order, using the volume and entry time to assign a weight of time relative to volume, and using the weights to determine each match. The server is further configured to use each determined match to complete a respective trade. The server is further configured to determine each match according to a first algorithm which is expressible as $$f_n = \frac{\left(\sum_{r=1}^{N} v_r - \sum_{r=1}^{n-1} v_r\right)^{w+1} - \left(\sum_{r=1}^{N} v_r - \sum_{r=1}^{n-1} v_r - v_n\right)^{w+1}}{\left(\sum_{r=1}^{N} v_r\right)^{w+1}}$$

wherein each buy or sell order relating to the first financial instrument is assigned a value of n based on a time order of receipt; N=a total number of buy or sell orders relating to the first financial instrument eligible for matching; $v_n$=a volume of the $n^{th}$ buy or sell order; r=a whole number greater than or equal to 1 and less than or equal to N; $v_r$=a volume of the $r^{th}$ buy or sell order; w=the assigned weight of time relative to volume; and $f_n$=a resultant pro-rata factor for the $n^{th}$ buy or sell order.

The server may be further configured to assign the weights by using observable data relating to the market. The server may be further configured to adjust at least one of the previously assigned weights by using observable data relating to the market.

In still another aspect, the invention provides a method of trading of financial instruments in a market. The method comprises the steps of: receiving from a plurality of users entry of buy orders and sell orders, each buy order and each sell order having a price, a volume, and an entry time and relating to a respective financial instrument; using a computer to assign a weight of time relative to volume to each buy order relating to a first financial instrument and having a first price based on its respective volume and entry time; using a computer to assign a weight of time relative to volume to each sell order relating to the first financial instrument and having the first price based on its respective volume and entry time; using a computer to match buy orders having the first price to sell orders having the first price using the assigned respective weights; and using the matched buy orders and sell orders to complete at least one trade. The step of using a computer to match buy orders to sell orders further comprises using the assigned respective weights according to a first algorithm which is expressible as $$f_n = \frac{\left(\sum_{r=1}^{N} v_r - \sum_{r=1}^{n-1} v_r\right)^{w+1} - \left(\sum_{r=1}^{N} v_r - \sum_{r=1}^{n-1} v_r - v_n\right)^{w+1}}{\left(\sum_{r=1}^{N} v_r\right)^{w+1}}$$

wherein each buy or sell order relating to the first financial instrument is assigned a value of n based on a time order of receipt; N=a total number of buy or sell orders relating to the first financial instrument eligible for matching; $v_n$=a volume of the $n^{th}$ buy or sell order; r=a whole number greater than or equal to 1 and less than or equal to N; $v_r$=a volume of the $r^{th}$ buy or sell order; w=the assigned weight of time relative to volume; and $f_n$=a resultant pro-rata factor for the $n^{th}$ buy or sell order.

The step of using a computer to assign the weight of time relative to volume to each buy order may further comprise using a computer to assign the weight of time relative to volume to each buy order by using observable data relating to the market. The method may further comprise the step of, for at least one buy order, using a computer to adjust at least one of the previously assigned weights by using observable data relating to the market.

The step of using a computer to assign the weight of time relative to volume to each sell order may further comprise using a computer to assign the weight of time relative to volume to each sell order by using observable data relating to the market. The method may further comprise the step of, for at least one sell order, using a computer to adjust at least one of the previously assigned weights by using observable data relating to the market.

DETAILED DESCRIPTION OF THE INVENTION

The essence of the invention is to seamlessly blend variable elements of volume and time into a single trading algorithm. The degree of bias, or weighting, given to each of these distinct elements can be controlled through selectable parameter settings within the algorithm, enabling a change to the market's matching characteristics with the ease of configuration change rather than the expensive process of software redevelopment and change. Furthermore, this multidimensional approach, which in a preferred embodiment includes the two dimensions of volume and time, may include a third dimension which gives a weighting towards particular market participants who carry out a pre-defined or specialized role in the market, such as, for example, a lead market maker.

Further benefits of the algorithm enable the dynamics of the market to be modified from time to time by:

the setting of configuration parameters according to observed changes in the market.

continuous or periodic feedback: allowing targets to be set for the participation profile which automatically feedback into the algorithm and adjust the algorithm's weightings to ensure the desired allocation across particular participant groups.

Different dynamics may be set to operate at different points in the trading day; for example, at market open, during the morning session, during the afternoon session, and at market close. Finally, the algorithm enables the gradual introduction of new elements into the central market's matching dynamics without running the risk of unsettling existing dynamics through too large a single step.

The invention relates to the field of financial markets. More particularly, the invention relates to the automated matching of buy orders and sell orders through periodic auction or continuous auction in a central order book. Such order books are traditionally implemented by regulated electronic stock exchanges and derivatives exchanges. More recently, off-exchange electronic multi-lateral trading facilities ("MTF") or alternative trading systems ("ATS") have begun to develop, offering similar central order book functionality.

In one aspect, the invention provides a system for facilitating trading of futures contracts in a market. The system comprises a server at which interest rate futures are actively traded and an interface that communicates with the server. The interface is configured to enable at least one of a buy order and a sell order to be entered. Each buy order and each sell order has a price, a volume, and an entry time and relates to a respective futures contract. The server is configured to receive from the interface a plurality of buy orders and sell orders, and the server is further configured to store the received buy orders and sell orders in a central order book. All newly received orders, also referred to as incoming orders, are presented to the central order book for matching. Incoming buy orders are presented for matching with sell orders stored in the order book, and incoming sell orders are presented for matching with buy orders stored in the order book. If a match does not occur because the matching criteria have not been met, the server can be configured to store the incoming order in the order book together with that order's price, volume, and entry time. Stored orders are also referred to as resting orders. The server is further configured to match buy orders relating to a first futures contract and having a first price to sell orders relating to the first futures contract and having the first price. The match is effected by first ensuring a price match between the buy order and the sell order, and then using the volume and entry time for each buy order and each sell order to calculate a volume factor and a time factor and to assign a volume weight and a time weight, and then using the volume weights and the time weights to determine each match. The server is further configured to use each determined match to complete a respective trade.

The system may be further configured to determine each match according to a first algorithm which is expressible as follows:

$$f_n = \frac{w_v \left( \frac{v_n}{\sum_{r=1}^{N} v_r} \right) \times w_t \left( \frac{(N+C)-n}{\sum_{r=1}^{N} r} \right)}{w_v + w_t}$$

In the above equation for the first algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; and $f_n$=a resultant pro-rata factor for the $n^{th}$ buy or sell order. The time offset C may be set equal to 1.

Figure 8:
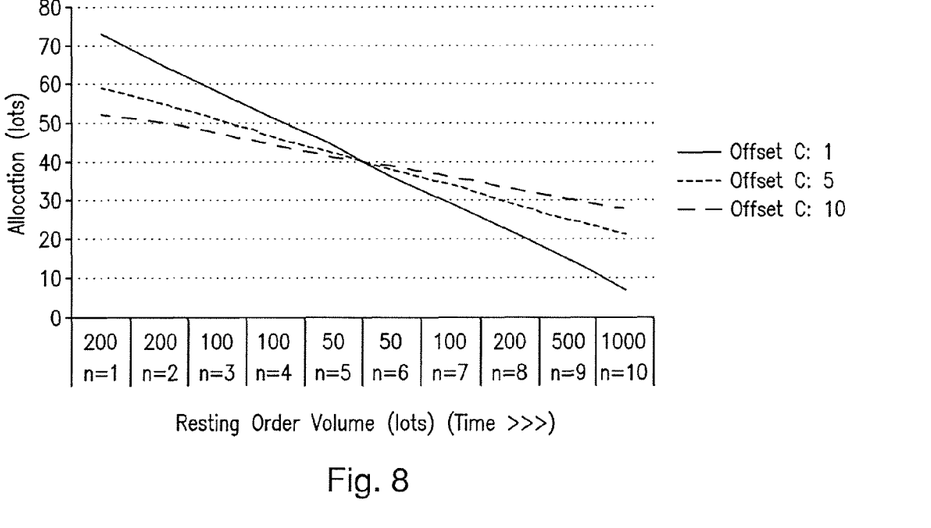
FIG. 8 is a graph that, using the first algorithm, illustrates a comparison between three different time offset factors as applied to a pure time pro-rata allocation for matching buy orders to sell orders.

Referring also to FIG. 8, the time offset affects the gradient of the time factor profile. A higher time offset value will reduce the difference in relative allocation between earlier and later resting orders. FIG. 8 provides a comparison of three time offset values to illustrate the effect upon the allocation given to later orders relative to earlier orders—the earliest order being the leftmost, with n=1; and the latest order being the rightmost, with n=10.

Alternatively, the server may be further configured to determine each match according to a second algorithm which is expressible as follows:

$$f_n = \left( \frac{v_n}{\sum_{r=1}^{N} v_r} \right)^{\frac{w_v}{S}} \times \left( \frac{(N+C)-n}{\sum_{r=1}^{N} r} \right)^{\frac{w_t}{S}}$$

In the above equation for the second algorithm, each buy or sell order relating to the futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; S=a smoothing factor; and $f_n$=a resultant pro-rata factor for the $n^{th}$ buy or sell order. Referring also to FIG. 8, the time offset C may be set equal to 1.

Each buy order and each sell order may be assigned at least a third weight value relating to a third characteristic. The server may be further configured to use at least the assigned third weight values in conjunction with the assigned volume weights and the assigned time weights to determine each match. The third characteristic may include an association with a trader, and the third weight value may relate to a preference value associated with the trader.

The server may be further configured to assign the volume weights and the time weights by using observable data relating to the market. The server may also be further configured to adjust at least one of the previously assigned volume weights and the time weights by using observable data relating to the market.

In another aspect, the invention provides a method of trading of futures contracts in a market. The method includes the steps of enabling a plurality of users, such as traders to enter buy orders and sell orders, each buy order and each sell order having a price, a volume, and an entry time and relating to a respective futures contract; assigning a volume weight and a time weight to each buy order relating to a first futures contract based on its respective volume and entry time; assigning a volume weight and a time weight to each sell order relating to the first futures contract based on its respective volume and entry time; matching buy orders to sell orders by first ensuring that the price of the buy order matches the price of the sell order and then using the assigned respective volume weights and time weights; and using the matched buy orders and sell orders to complete at least one trade.

The matching step may further include using the assigned respective volume weights and time weights according to a first algorithm which is expressible as follows:

$$f_n = \frac{w_v \left( \frac{v_n}{\sum_{r=1}^{N} v_r} \right) \times w_t \left( \frac{(N+C)-n}{\sum_{r=1}^{N} r} \right)}{w_v + w_t}$$

In the above equation for the first algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; and $f_n$=a resultant pro-rata factor for the $n^{th}$ buy or sell order. Referring also to FIG. 8, the time offset C may be set equal to 1.

Alternatively, the matching step may further include using the assigned respective volume weights and time weights according to a second algorithm which is expressible as follows:

$$f_n = \left(\frac{v_n}{\sum_{r=1}^{N} v_r}\right)^{\frac{w_v}{S}} \times \left(\frac{(N+C)-n}{\sum_{r=1}^{N} r}\right)^{\frac{w_t}{S}}$$

In the above equation for the second algorithm, each buy or sell order relating to the first futures contract is assigned a value of n based on a time order of receipt; N=a total number of buy or sell orders relating to the first futures contract; $v_n$=a volume of the $n^{th}$ buy or sell order; C=a time offset; $w_v$=the assigned volume weight; $w_t$=the assigned time weight; S=a smoothing factor; and $f_n$=a resultant pro-rata factor for the $n^{th}$ buy or sell order. Referring also to FIG. 8, the time offset C may be set equal to 1.

The method may further include the step of assigning at least a third weight value to each buy order and to each sell order. The third weight value may relate to a third characteristic. The matching step may further include matching buy orders to sell orders using the assigned respective volume weights, time weights, and at least third weight values. The third characteristic may include an association with a trader and the third weight value may relate to a preference value associated with the trader.

The step of assigning the volume weight and the time weight to each buy order may further include assigning the volume weight and the time weight to each buy order by using observable data relating to the market. The method may further include the step of, for at least one buy order, adjusting at least one of the previously assigned volume or time weights by using observable data relating to the market. Similarly, the step of assigning the volume weight and the time weight to each sell order may further include assigning the volume weight and the time weight to each sell order by using observable data relating to the market. The method may further include the step of, for at least one sell order, adjusting at least one of the previously assigned volume or time weights by using observable data relating to the market.

Figure 1:
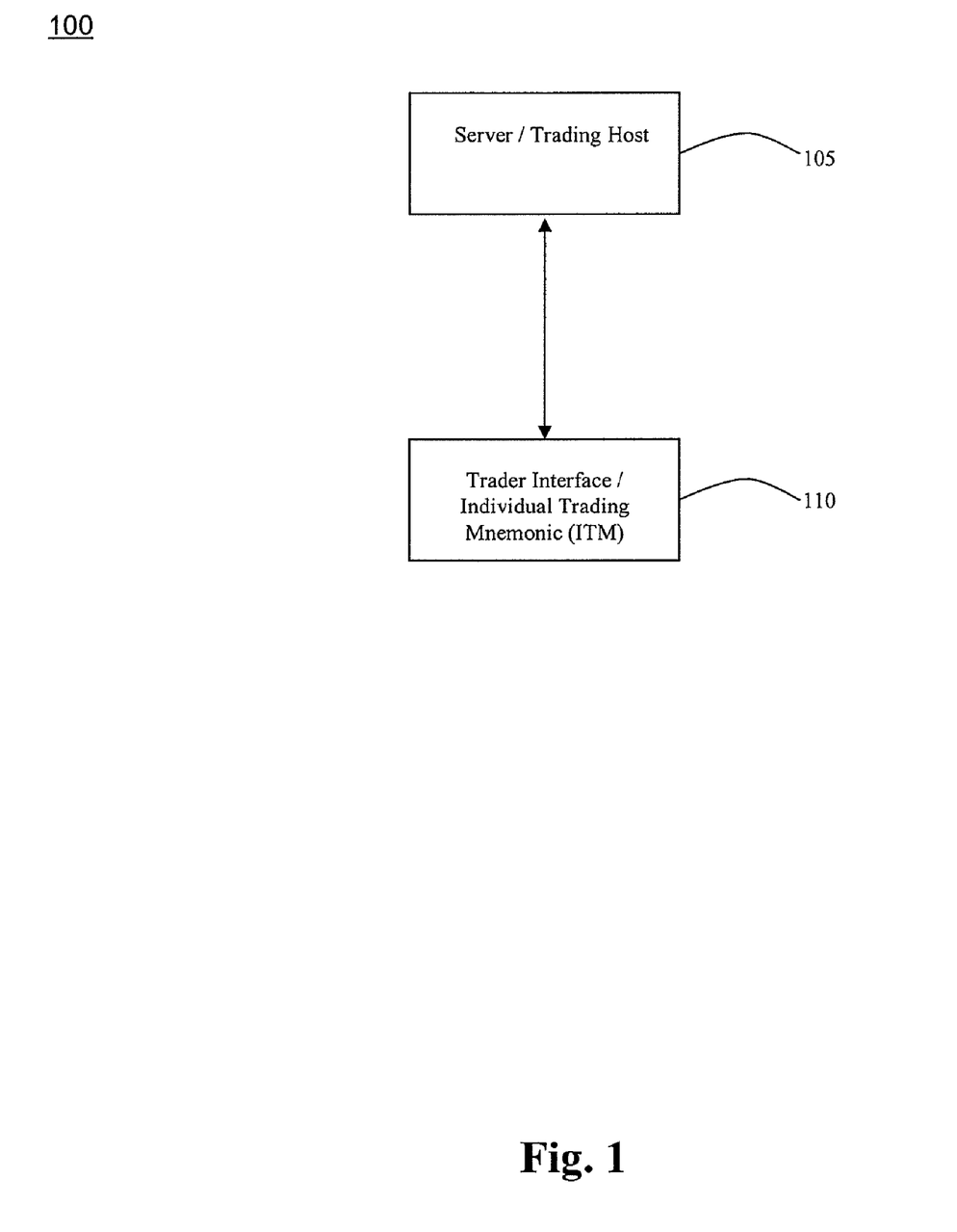
FIG. 1 illustrates a block diagram of a system for facilitating trade matching of financial instruments according to a preferred embodiment of the invention.

Referring to FIG. 1, a block diagram illustrates an electronic trading system 100 according to a preferred embodiment of the present invention. The system includes one or more servers 105, also referred to as a trading host 105, and one or more trader interfaces 110, also referred to as an Individual Trading Mnemonic (ITM) 110. The trading host 105 is preferably implemented by the use of one or more general purpose computers, such as, for example, a Sun Microsystems F15k. Each ITM 110 is also preferably implemented by the use of one or more general purpose computers, such as, for example, a typical personal computer manufactured by Dell, Gateway, or Hewlett-Packard. Each of the trading host 105 and the ITM 110 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), or the like. The trading host may use its microprocessor to read a computer-readable medium containing software that includes instructions for carrying out one or more of the functions of the trading host 105, as further described below.

Each of the trading host 105 and the ITM 110 can also include computer memory, such as, for example, random-access memory (RAM). However, the computer memory of each of the trading host 105 and the ITM 110 can be any type of computer memory or any other type of electronic storage medium that is located either internally or externally to the trading host 105 or the ITM 110, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), a computer-readable medium, or the like. According to exemplary embodiments, the respective RAM can contain, for example, the operating program for either the trading host 105 or the ITM 110. As will be appreciated based on the following description, the RAM can, for example, be programmed using conventional techniques known to those having ordinary skill in the art of computer programming. The actual source code or object code for carrying out the steps of, for example, a computer program can be stored in the RAM. Each of the trading host 105 and the ITM 110 can also include a database. The database can be any type of computer database for storing, maintaining, and allowing access to electronic information stored therein. The trading host 105 preferably resides on a network, such as a local area network (LAN), a wide area network (WAN), a virtual private network (VPN), or the Internet. The ITM 110 preferably is connected to the network on which the host server resides, thus enabling electronic communications between the trading host 105 and the ITM 110 over a communications connection, whether locally or remotely, such as, for example, an Ethernet connection, an RS-232 connection, or the like.

Figure 2A:
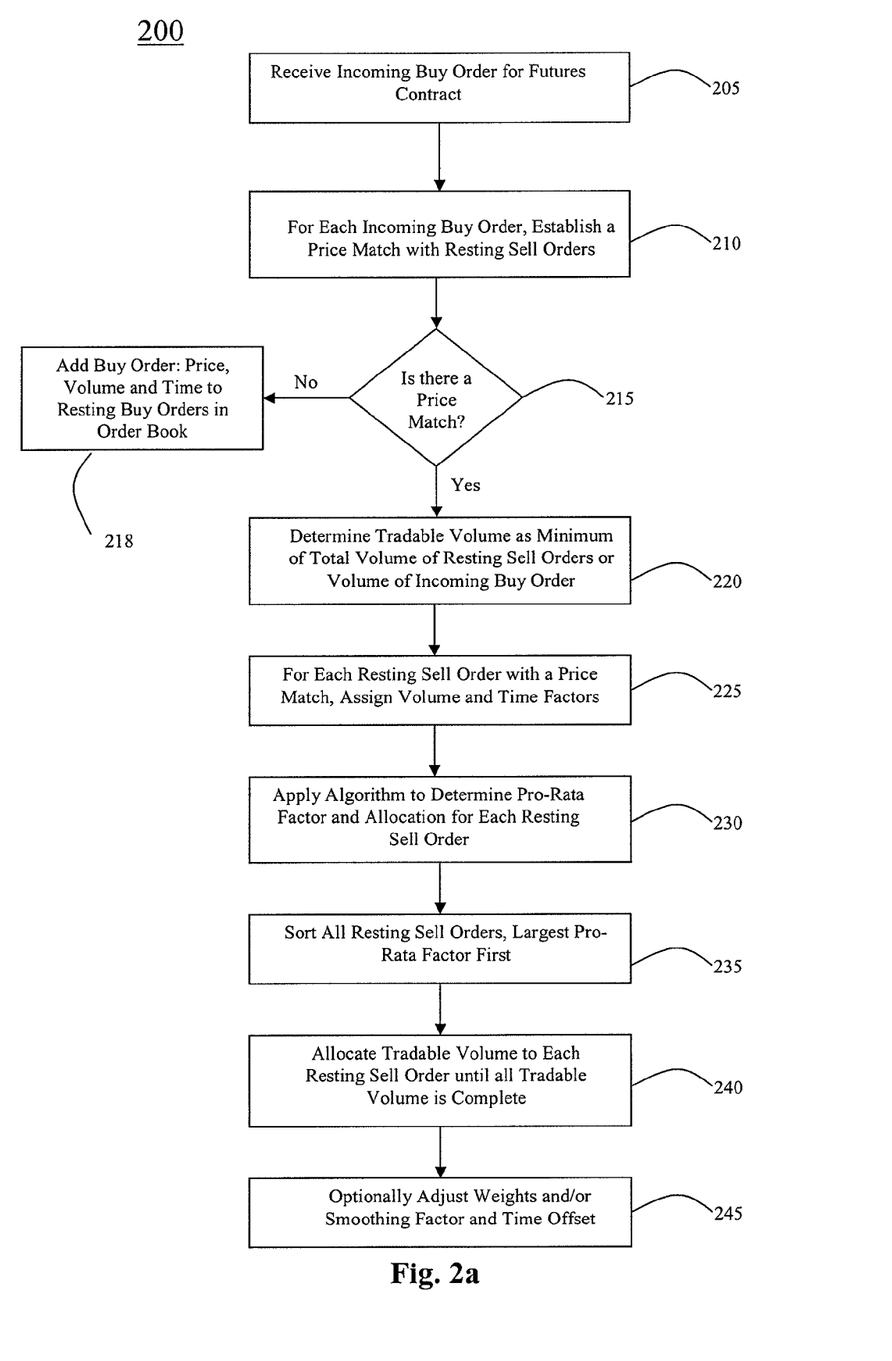
FIGS. 2a and 2b are flow charts that illustrates a method of facilitating trade matching of financial instruments according to a preferred embodiment of the invention.
Figure 2B:
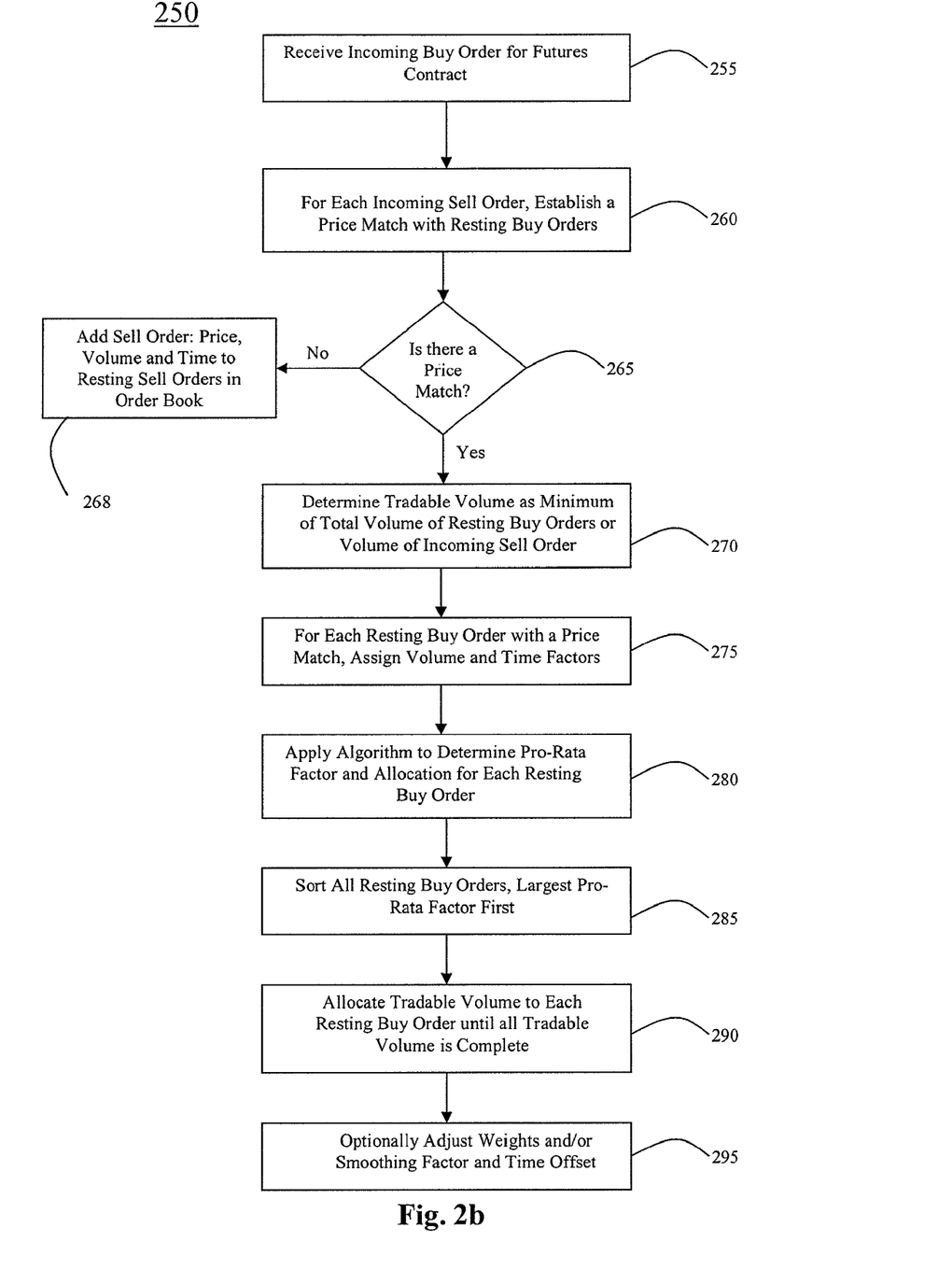

Referring to FIGS. 2a and 2b, flow charts 200 and 250 illustrate a method of facilitating trading of futures contracts according to a preferred embodiment of the present invention. For flow chart 200, in the first step 205, the trading host 105 receives incoming buy orders relating to a particular futures contract. At steps 210 and 215, a price match is determined for the incoming buy order against the sell orders resting in the order book. In general, with all trading algorithms, the highest bid (buy) prices and the lowest offer (sell) prices have priority over other orders at different prices in the order book. A price match occurs by matching the incoming buy order against all resting sell orders in the order book at the best market price level. If there is no price match for the incoming buy order, then the buy order, its price, its volume, and its entry time are stored at step 218 with the other resting buy orders in the order book. At step 220, the tradable volume is determined as the minimum of the total volume of resting sell orders in the order book or the volume of the incoming buy order.

At step 225, the volume factors and time factors are calculated for each resting sell order, according to their individual volumes and the individual times at which they entered the order book. At step 230, the selected smoothing factor (if applicable), the volume weight parameter, and the time weight parameter are assigned, and a pro-rata factor and allocation are determined for each resting sell order using an appropriate algorithm. Then, at step 235, all resting sell orders are sorted by pro-rata factor. At step 240, the tradable volume is distributed among the resting sell orders in accordance with the allocation determined in step 230. Step 240 is repeated until all tradable volume is exhausted, and the trades are then completed on the basis of these matches. Finally, at step 245, the weight parameters, the smoothing factor, and the time offset may be optionally adjusted based on observations relating to market conditions and trends.

Referring to FIG. 2b, a similar process is illustrated for matching incoming sell orders to resting buy orders. In the first step 255, the trading host 105 receives incoming sell orders relating to a particular futures contract. At steps 260 and 265, a price match is determined for the incoming sell order against the buy orders resting in the order book. In general, with all trading algorithms, the highest bid (buy)

prices and the lowest offer (sell) prices have priority over other orders at different prices in the order book. A price match occurs by matching the incoming sell order against resting buy orders in the order book at the best market price level. If there is no price match for the incoming sell order, then the sell order, its price, its volume, and its entry time are stored at step 268 with the other resting sell orders in the order book. At step 270, the tradable volume is determined as the minimum of the total volume of resting buy orders in the order book or the volume of the incoming sell order.

At step 275, the volume factors and time factors are calculated for each resting buy order, according to their individual volumes and the individual times at which they entered the order book. At step 280, the selected smoothing factor (if applicable), the volume weight parameter, and the time weight parameter are assigned, and a pro-rata factor and allocation are determined for each resting buy order using an appropriate algorithm. Then, at step 285, all resting buy orders are sorted by pro-rata factor. At step 290, the tradable volume is distributed among the resting buy orders in accordance with the allocation determined in step 280. Step 290 is repeated until all tradable volume is exhausted, and the trades are then completed on the basis of these matches. Finally, at step 295, the weight parameters, the smoothing factor, and the time offset may be optionally adjusted based on observations relating to market conditions and trends.

The volume factor is calculated in accordance with a volume pro-rata method. Volume pro-rata matching allocates incoming orders against eligible resting orders in proportion to the amount of volume of each individual resting order has relative to the total combined volume of all eligible resting orders in the order book. Each unit of volume is termed a "lot". For each resting order n with volume $v_n$ lots in a total of N orders, the volume factor is calculated as follows:

$$VolumeFactor(n) = \frac{v_n}{\sum_{r=1}^{N} v_r} \quad \text{Equation 1}$$

The volume of all resting and incoming orders will comprise a whole number of lots. In order to account for situations where a fraction of a lot is allocated to the incoming orders, trading hosts have conventionally employed a method of rounding. For example, the trading host may employ a method of rounding down allocations greater than one unit and rounding up allocations of less than one unit. Orders are matched starting with the largest allocation until all incoming orders are fulfilled. Subsequent passes may be necessary if all tradable volume is not fulfilled on the first pass. Examples provided in this application will use this method of rounding and allocation.

Table 1 below shows a typical volume pro-rata allocation of a 400 lot buy order against N=10 resting sell orders in the central order book.

TABLE 1

| Time (n) | Trader | Volume (v) (lots) | Volume Factor | Allocation (lots) |
|---|---|---|---|---|
| 1 | AAA | 200 | 8% | (8% × 400 =) 32 |
| 2 | BBB | 200 | 8% | (8% × 400 =) 32 |
| 3 | CCC | 100 | 4% | (4% × 400 =) 16 |
| 4 | DDD | 100 | 4% | (4% × 400 =) 16 |
| 5 | EEE | 50 | 2% | (2% × 400 =) 8 |
| 6 | FFF | 50 | 2% | (2% × 400 =) 8 |

TABLE 1-continued

| Time (n) | Trader | Volume (v) (lots) | Volume Factor | Allocation (lots) |
|---|---|---|---|---|
| 7 | GGG | 100 | 4% | (4% × 400 =) 16 |
| 8 | HHH | 200 | 8% | (8% × 400 =) 32 |
| 9 | JJJ | 500 | 20% | (20% × 400 =) 80 |
| 10 | KKK | 1000 | 40% | (40% × 400 =) 160 |
| Total | | 2500 | | 400 |

Time priority matching simply allocates the incoming order amongst the eligible resting orders, giving a greater allocation to those resting orders which entered the order book first. Table 2 below shows the time priority allocation of a 400 lot buy order against N=10 resting sell orders (sorted by time) in the central order book.

TABLE 2

| Time (n) | Trader | Volume (v) (lots) | Allocation (lots) |
|---|---|---|---|
| 1 | AAA | 200 | 200 |
| 2 | BBB | 200 | 200 |
| 3 | CCC | 100 | 0 |
| 4 | DDD | 100 | 0 |
| 5 | EEE | 50 | 0 |
| 6 | FFF | 50 | 0 |
| 7 | GGG | 100 | 0 |
| 8 | HHH | 200 | 0 |
| 9 | JJJ | 500 | 0 |
| 10 | KKK | 1000 | 0 |
| Total | | 2500 | 400 |

Time pro-rata is a key element of the present invention and an innovative variation on the time priority concept. The time factor is calculated in accordance with the time pro-rata method. Eligible resting orders are allocated a proportion of the incoming order on based upon the time they entered the order book relative to the time other eligible resting orders entered the order book. The earlier the order entered the order book, the greater the allocation. This differs from the existing time priority concept, in that all orders have the potential to receive an allocation against the incoming order.

For each resting order n with volume v lots in a total of N orders (sorted in order of time entered into the order book, with n=1 being the first order entered and n=N being the last order entered), the time pro-rata factor is calculated using Equation 2 below. C is a time offset and may be set equal to 1.

$$TimeFactor(n) = \frac{(N + C) - n}{\sum_{r=1}^{N} r} \quad \text{Equation 2}$$

Table 3 below provides a simplified time pro-rata allocation of a 400 lot buy order against N=10 resting sell orders (sorted by time) in the central order book. It is noted that in operation, the allocation to each resting sell order n cannot exceed the volume v of each order. This situation does not arise in the example below, but where it does arise, subsequent passes of the allocation will be required to fulfill all of the incoming order.

TABLE 3

| Time (n) | Trader | Volume (v) (lots) | Time Factor | Allocation (lots) |
|---|---|---|---|---|
| 1 | AAA | 200 | 18.2% | (18.2% × 400 =) 73 |
| 2 | BBB | 200 | 16.4% | (16.4% × 400 =) 66 |
| 3 | CCC | 100 | 14.5% | (14/5% × 400 =) 59 |
| 4 | DDD | 100 | 12.7% | (12.7% × 400 =) 51 |
| 5 | EEE | 50 | 10.9% | (10.9% × 400 =) 44 |
| 6 | FFF | 50 | 9.1% | (9.1% × 400 =) 36 |
| 7 | GGG | 100 | 7.3% | (7.3% × 400 =) 29 |
| 8 | HHH | 200 | 5.5% | (5.5% × 400 =) 21 |
| 9 | JJJ | 500 | 3.6% | (3.6% × 400 =) 14 |
| 10 | KKK | 1000 | 1.8% | (1.8% × 400 =) 7 |
| Total | | 2500 | | 400 |

Combining the Volume Pro-Rata element and the Time Pro-Rata element into a single algorithm, and governing the weight or bias of each element, enables the market's central matching characteristics to be modified and offers greater flexibility to rapidly respond to evolutions in central market dynamics. Two methods are provided for combining the volume pro-rata and time pro-rata elements into a single algorithm:

Multiple Weighting (the first algorithm): The simpler of the two methods provides a mechanism for multiplying each of the elements by a weighting factor, which will govern the bias of each respective element. The elements are then combined through simple arithmetic addition.

Index Weighting (the second algorithm): This method affords a greater level of control over the shape of the allocation profile. The bias towards any element is controlled through raising each element to the power of its respective weighting. The elements are subsequently combined through multiplication. Furthermore, this method allows the allocation profile to be smoothed or exaggerated by employing a smoothing factor. The result is then normalized.

The multiple weighting method is implemented according to the following description. For each resting order n with volume $v_n$ lots in a total of N orders (sorted in order of time entered into the order book, with n=1 being the first order entered and n=N being the last order entered), the pro-rata factor $f_n$ is calculated as follows:

$$f_n = \frac{w_v\left(\frac{v_n}{\sum_{r=1}^{N} v_r}\right) \times w_t\left(\frac{(N+C)-n}{\sum_{r=1}^{N} r}\right)}{w_v + w_t} \quad \text{Equation 3}$$

The allocation $A_n$ for each resting order n against incoming order of volume R lots is calculated as follows:

$$A_n = \mathrm{MIN}(v_n, f_n \times R) \quad \text{Equation 4}$$

The MIN( ) function in Equation 4 ensures that the allocation for resting order n does not exceed the volume v of the order.
KEY—Parameters
N Number of Resting Buy (Sell) Orders Sorted by Time—each n=1(first) to N (last)
$v_n$ Volume of Each Resting Order n
$w_v$ Weighting of Volume Pro-Rata Element
$w_t$ Weighting of Time Pro-Rata Element
C Time offset (generally set to 1)
$f_n$ Pro-rata factor for Resting Buy (Sell) Order n
$A_n$ Allocation for Resting Buy (Sell) Order n
R Incoming Sell (Buy) Order Volume Through controlling the parameters above, the allocation of the incoming order to the resting orders may be governed accordingly. Table 4 below demonstrates the allocation of an incoming buy order for 400 lots against N=10 resting sell orders in the central order book, where the respective weightings for the volume and time elements are:

Volume $W_v$=1; Time $W_t$=0 (equivalent to pure Volume Pro-Rata)
Volume $W_v$=0; Time $W_t$=1 (equivalent to pure Time Pro-Rata)
Volume $W_v$=1; Time $W_t$=1 (equal weighting to both volume and time elements)

TABLE 4

| Time (n) | Trader | Resting Order Volume (v) (lots) | $W_v = 1; W_t = 0$ Volume Pro-Rata Allocation | $W_v = 0;$ $W_t = 1$ Time Pro-Rata Allocation | $W_v = 1;$ $W_t = 1$ Equally Weighted Allocation |
|---|---|---|---|---|---|
| 1 | AAA | 200 | 32 | 73 | 53 |
| 2 | BBB | 200 | 32 | 66 | 49 |
| 3 | CCC | 100 | 16 | 59 | 38 |
| 4 | DDD | 100 | 16 | 51 | 33 |
| 5 | EEE | 50 | 8 | 44 | 25 |
| 6 | FFF | 50 | 8 | 36 | 22 |
| 7 | GGG | 100 | 16 | 29 | 22 |
| 8 | HHH | 200 | 32 | 21 | 26 |
| 9 | JJJ | 500 | 80 | 14 | 48 |
| 10 | KKK | 1000 | 160 | 7 | 84 |
| Total | | 2500 | 400 | 400 | 400 |

Figure 3:
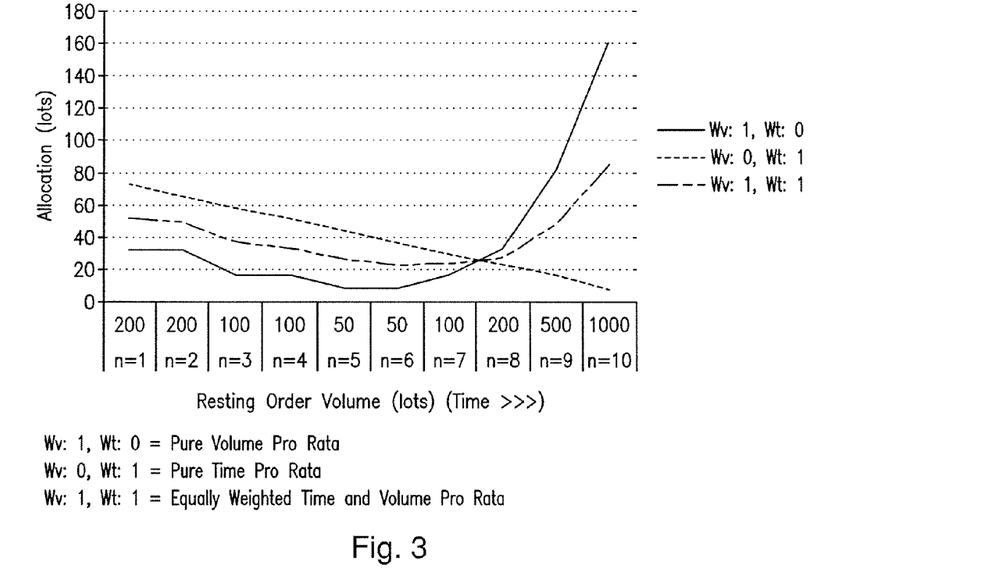
FIG. 3 is a graph that, using the first algorithm, illustrates a comparison between a pure volume pro-rata allocation, a pure time pro-rata allocation, and an equally weighted time and volume pro-rata allocation for matching buy orders to sell orders.

Referring also to FIG. 3, the data shown in Table 4 is depicted graphically to provide a visualization of how the allocation profile against the resting orders is altered using the parameters. The solid line ($W_v$=1, $W_t$=0) shows a pure volume pro-rata allocation, thus favoring orders n=9 and n=10, which have the largest volume. The dotted line ($W_v$=0, $W_t$=1) shows a pure time pro-rata allocation, thus favoring those orders which entered the market first, independently of their size. However, by equally weighting each element through $W_v$ and $W_t$, the resultant profile allocates the incoming order among the resting orders according to both their position in the order book and their relative volume. This is depicted through the broken line ($W_v$=1, $W_t$=1). In balancing the two elements, the market can be configured to appeal to traders who improve the market price by holding one of the earlier orders in the order book, and also to appeal to traders who offer sizable liquidity to the market by holding the larger volume orders. Alternatively, to favor the time element, yet still reward, but to a lesser degree, those that enter larger volume orders into the market, for example, a relative weighting of $W_v$=1, $W_t$=3 (not shown in FIG. 3) may be chosen to give a 75% preference to the time weighting parameter.

The index weighting method is implemented according to the following description. For each resting order n with volume $v_n$ lots in a total of N orders (sorted in order of time entered into the order book, with n=1 being the first order entered and n=N being the last order entered), the pro-rata factor $f_n$ is calculated as follows:

$$f_n = \left(\frac{v_n}{\sum_{r=1}^{N} v_r}\right)^{\frac{w_v}{S}} \times \left(\frac{(N+C)-n}{\sum_{r=1}^{N} r}\right)^{\frac{w_t}{S}} \quad \text{Equation 5}$$

The allocation $A_n$ for each resting order n against incoming order of volume R lots is calculated as follows:

$$A_n = \text{MIN}\left(v_n, \frac{f_n}{\sum_{r=1}^{N} f_r} \times R\right) \quad \text{Equation 6}$$

KEY—Parameters

N Number of Resting Buy (Sell) Orders Sorted by Time— each n=1 (first) to N (last)

$v_n$ Volume of Each Resting Order n $w_v$ Weighting of Volume Pro-Rata Element $w_t$ Weighting of Time Pro-Rata Element C Time offset (generally set to 1)

S Smoothing factor (smoothing increases with S)

Figure 4:
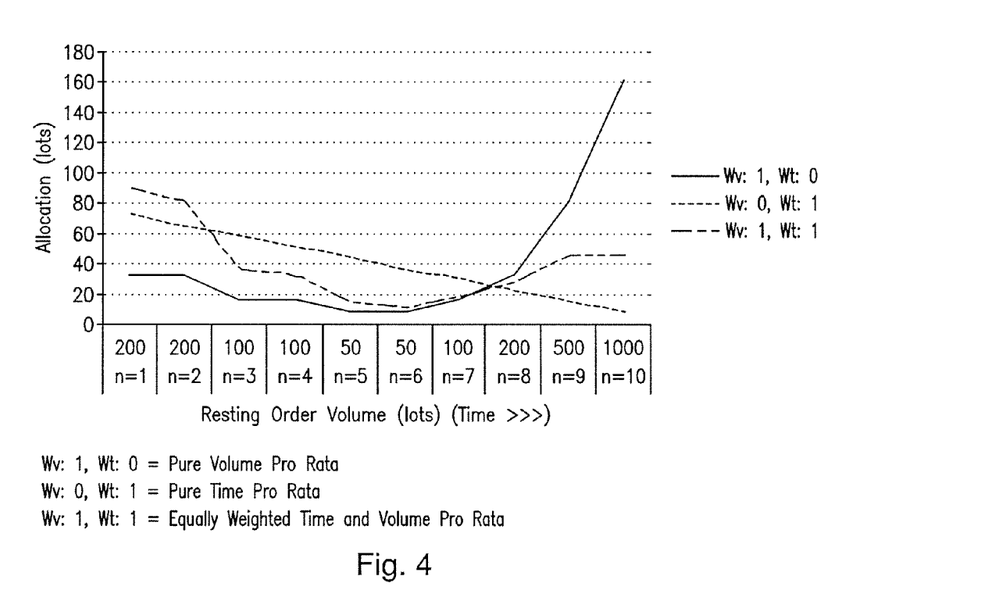
FIG. 4 is a graph that, using the second algorithm, illustrates a comparison between a pure volume pro-rata allocation, a pure time pro-rata allocation, and an equally weighted time and volume pro-rata allocation using index weighting and a smoothing factor equal to one for matching buy orders to sell orders.

$f_n$ Pro-rata factor for Resting Buy (Sell) Order n $A_n$ Allocation for Resting Buy (Sell) Order n R Incoming Sell (Buy) Order Volume Referring to FIG. 4 and Table 5 below, a profile of the allocation against the resting orders is altered as shown using the parameters. Similarly as in the multiple weighting method described above, a volume weight parameter $W_v$ of one (1) and a time weight parameter $W_t$ of zero (0) provides a pure volume pro-rata algorithm, and a volume weight parameter $W_v$ of zero (0) and a time weight parameter $W_t$ of one (1) provides a pure time pro-rata algorithm. Equally weighting each parameter with a value of one (1) provides a profile which allocates the incoming order amongst the resting orders according to both their position in the order book and their relative volume.

TABLE 5

| Time (n) | Trader | Resting Order Volume (v) (lots) | $W_v = 1; W_t = 0$ Volume Pro-Rata Allocation | $W_v = 0; W_t = 1$ Time Pro-Rata Allocation | $W_v = 1; W_t = 1$ Equally Weighted Allocation |
|---|---|---|---|---|---|
| 1 | AAA | 200 | 32 | 73 | 91 |
| 2 | BBB | 200 | 32 | 65 | 82 |
| 3 | CCC | 100 | 16 | 58 | 36 |
| 4 | DDD | 100 | 16 | 51 | 31 |
| 5 | EEE | 50 | 8 | 44 | 13 |
| 6 | FFF | 50 | 8 | 36 | 11 |
| 7 | GGG | 100 | 16 | 29 | 18 |
| 8 | HHH | 200 | 32 | 22 | 27 |
| 9 | JJJ | 500 | 80 | 15 | 46 |
| 10 | KKK | 1000 | 160 | 7 | 45 |
| Total | | 2500 | 400 | 400 | 400 |

Figure 5:
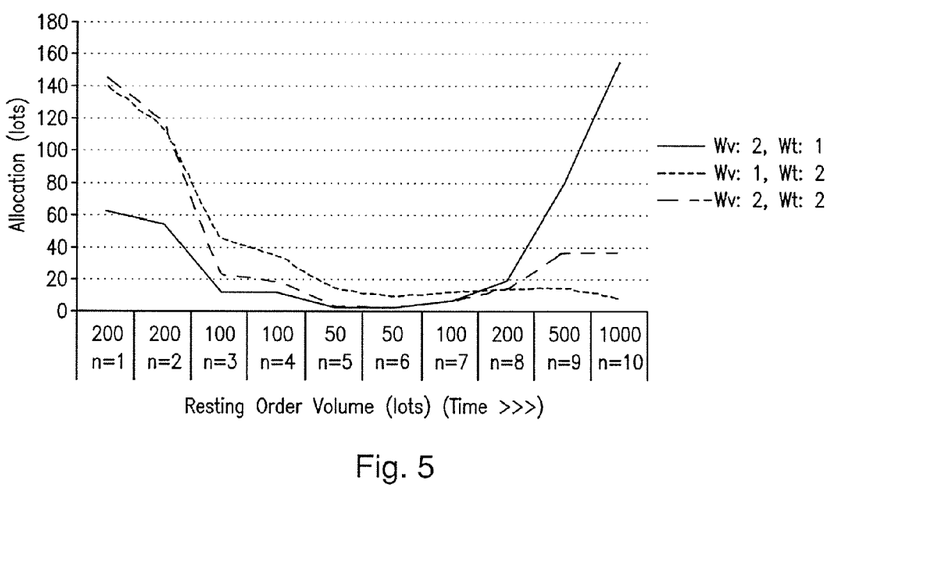
FIG. 5 is a graph that, using the second algorithm, illustrates a comparison between a volume-biased pro-rata allocation, a time-biased pro-rata allocation, and an equally weighted time and volume pro-rata allocation using a higher index value and a smoothing factor equal to one for matching buy orders to sell orders.

However, the index method provides a greater level of control over the shape of the allocation profile, as compared with the multiple weighting method. Referring also to FIG. 5 and Table 6 below, it may be seen that higher order parameter values for the volume weights and time weights offer a greater bias towards larger volume orders or earlier orders as $W_v$ and $W_t$ are adjusted respectively.

TABLE 6

| Time (n) | Trader | Resting Order Volume (v) (lots) | $W_v = 2; W_t = 1$ Volume Bias Pro-Rata Allocation | $W_v = 1; W_t = 2$ Time Bias Pro-Rata Allocation | $W_v = 2; W_t = 2$ Equally Weighted Allocation |
|---|---|---|---|---|---|
| 1 | AAA | 200 | 62 | 141 | 145 |
| 2 | BBB | 200 | 56 | 114 | 118 |
| 3 | CCC | 100 | 12 | 45 | 23 |
| 4 | DDD | 100 | 10 | 35 | 17 |
| 5 | EEE | 50 | 2 | 12 | 3 |
| 6 | FFF | 50 | 1 | 8 | 2 |
| 7 | GGG | 100 | 6 | 11 | 5 |
| 8 | HHH | 200 | 19 | 12 | 13 |
| 9 | JJJ | 500 | 77 | 15 | 37 |
| 10 | KKK | 1000 | 155 | 7 | 37 |
| Total | | 2500 | 400 | 400 | 400 |

Figure 6:
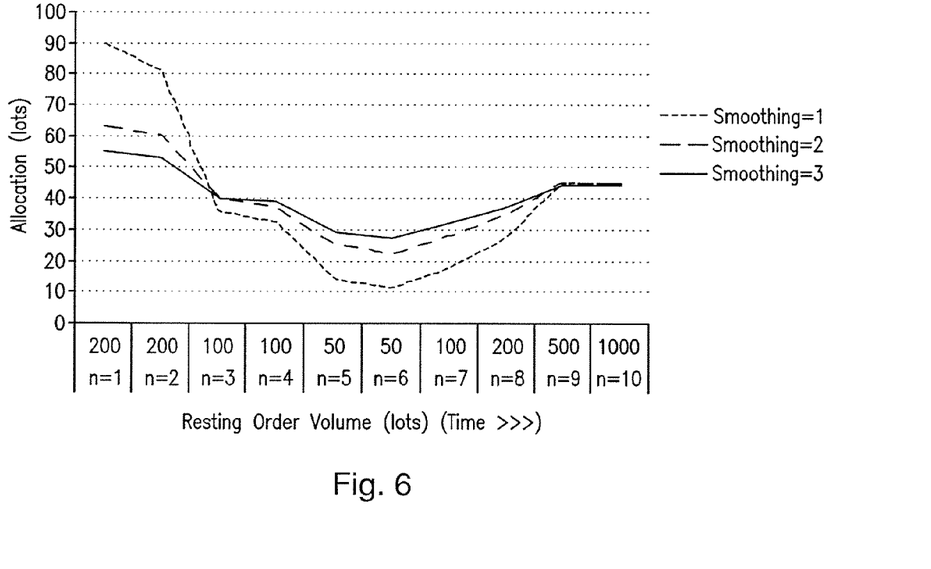
FIG. 6 is a graph that, using the second algorithm, illustrates a comparison between three different smoothing factors as applied to an equally weighted time and volume pro-rata allocation using an index value equal to one for matching buy orders to sell orders.

The index method also provides flexibility over the smoothness of the allocation profile. In each of FIGS. 4 and 5, a smoothing factor S of one (1) is used for both the volume weight parameter and the time weight parameter. Referring to FIG. 6 and Table 7 below, it is seen that even with equally weighted volume and time elements (in this example, both weight parameters are set equal to 1), by increasing the smoothing factor value of S, the profile of allocation of the incoming order over the resting orders in the central limit order book will be smoothed, or more evenly distributed. Ultimately, increasing the smoothing factor will evenly distribute the incoming order over all the resting orders, subject to a maximum allocation of their individual volumes v.

TABLE 7

| Time (n) | Trader | Resting Order Volume (v) (lots) | $W_v = 1; W_t = 1$ Smoothing = 1 | $W_v = 1; W_t = 1$ Smoothing = 2 | $W_v = 1; W_t = 1$ Smoothing = 3 |
|---|---|---|---|---|---|
| 1 | AAA | 200 | 91 | 64 | 55 |
| 2 | BBB | 200 | 82 | 61 | 54 |
| 3 | CCC | 100 | 36 | 40 | 41 |
| 4 | DDD | 100 | 31 | 37 | 38 |
| 5 | EEE | 50 | 13 | 24 | 29 |
| 6 | FFF | 50 | 11 | 22 | 27 |
| 7 | GGG | 100 | 18 | 28 | 32 |
| 8 | HHH | 200 | 27 | 34 | 36 |
| 9 | JJJ | 500 | 46 | 45 | 44 |
| 10 | KKK | 1000 | 45 | 45 | 44 |
| Total | | 2500 | 400 | 400 | 400 |

The multiple weighting method and the index weighting method, as described above, are embodiments of the invention which operate in two dimensions: time and volume. However, the invention can operate in three, four, or more dimensions, with each dimension contributing to the allocation of incoming order to the resting orders in the central order book.

For example, certain market participants, such as a lead market maker or a designated market maker, may carry out pre-defined or specialized roles in the market. (Exchanges often employ many terms for market participants who perform specialised roles. Lead Market Makers are often also referred to as Specialists or Primary Market Makers. Designated Market Makers may also be referred to as Competing Market Makers.) Such participants could have their allocations weighted in accordance with their role. Prioritizing allocation in accordance with the trader's role is often referred to as preferencing. Accordingly, in the following example, a preference value is assigned to each buy order and each sell order to reflect the role of the trader behind the order. Referring to Equation 7, the following algorithm implements the additional dimension of preferencing into the algorithm for index weighting method described above. For each resting order n (sorted in order of time entered into the order book) with volume $v_n$ lots and preference value $p_n$ in a total of N orders, the pro-rata factor $f_n$ is calculated as follows:

$$f_n = \left(\frac{v_n}{\sum_{r=1}^{N} v_r}\right)^{\frac{w_v}{S}} \times \left(\frac{(N+C)-n}{\sum_{r=1}^{N} r}\right)^{\frac{w_t}{S}} \times (p_n)^{\frac{w_p}{S}} \quad \text{Equation 7}$$

The allocation $A_n$ for each resting order n against incoming order of volume R lots is calculated as follows:

$$A_n = \text{MIN}\left(v_n, \frac{f_n}{\sum_{r=1}^{N} f_r} \times R\right) \quad \text{Equation 8}$$

The MIN( ) function ensures that the allocation for resting order n does not exceed the volume v of the order.

KEY—Parameters

Figure 7:
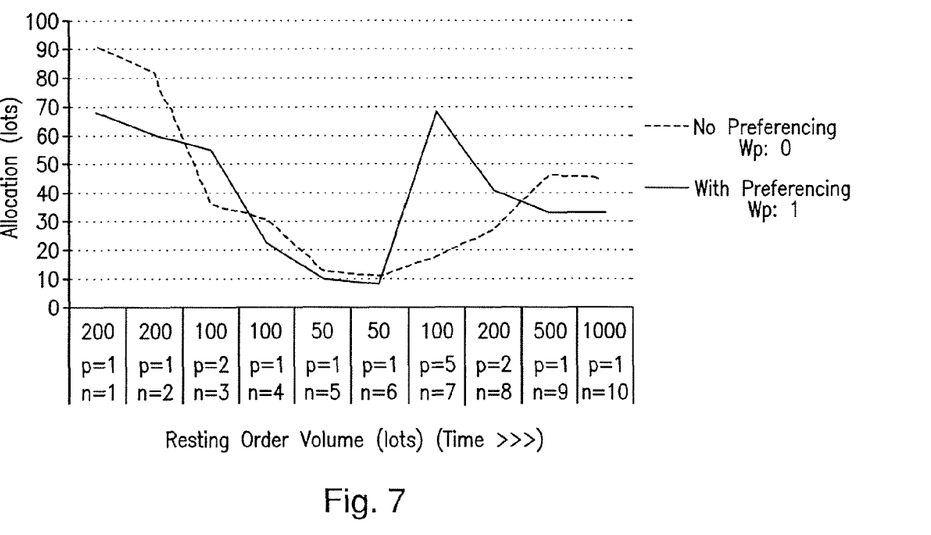
FIG. 7 is a graph that, using the second algorithm, illustrates a comparison between applying a preferencing factor or not applying a preferencing factor for an equally weighted time and volume pro-rata allocation using an index value equal to one for matching buy orders to sell orders.

N Number of Resting Buy (Sell) Orders Sorted by Time—each n=1 (first) to N (last)
$v_n$ Volume of Each Resting Order n
$w_v$ Weighting of Volume Pro-Rata Element
$w_t$ Weighting of Time Pro-Rata Element
$p_n$ Preference Value of Each Resting Order n
$w_p$, Weighting of Preferencing Element
C Time offset (generally set to 1)
S Smoothing factor (smoothing increases with S)
$f_n$ Pro-rata factor for Resting Buy (Sell) Order n
$A_n$ Allocation for Resting Buy (Sell) Order n
R Incoming Sell (Buy) Order Volume Referring also to FIG. 7, the data shown in Table 8 is depicted graphically to compare the allocation profile with no preferencing with the allocation profile where the overall preference weighting is set to one (1), thus demonstrating how the preference values adjust the allocation profile in accordance with the trader's role. Trader GGG is assigned Lead Market Maker status with a preference value of five (5), and Traders CCC and HHH are assigned Designated Market Maker status, each with a preference value of two (2). All other traders have a standard preference value of one (1). The volume weight parameter and time weight parameter, $W_v$ and $W_t$ respectively, are each set to one (1) in this example.

TABLE 8

| Time (n) | Trader | Preference Value (p) | Resting Order Volume (v) (lots) | $W_v = 1; W_t = 1$ No Preferencing ($W_p = 0$) | $W_v = 1; W_t = 1$ With Preferencing ($W_p = 1$) |
|---|---|---|---|---|---|
| 1 | AAA | 1 | 200 | 91 | 68 |
| 2 | BBB | 1 | 200 | 82 | 61 |
| 3 | CCC | 2 | 100 | 36 | 55 |
| 4 | DDD | 1 | 100 | 31 | 23 |
| 5 | EEE | 1 | 50 | 13 | 10 |
| 6 | FFF | 1 | 50 | 11 | 8 |
| 7 | GGG | 5 | 100 | 18 | 68 |
| 8 | HHH | 2 | 200 | 27 | 41 |

TABLE 8-continued

| Time (n) | Trader | Preference Value (p) | Resting Order Volume (v) (lots) | $W_v = 1; W_t = 1$ No Preferencing ($W_p = 0$) | $W_v = 1; W_t = 1$ With Preferencing ($W_p = 1$) |
|---|---|---|---|---|---|
| 9 | JJJ | 1 | 500 | 46 | 33 |
| 10 | KKK | 1 | 1000 | 45 | 33 |
| Total | | | 400 | 400 | 400 |

Under certain circumstances where each resting order's allocation is based upon both the size of the order (i.e., volume) and relative time the order was entered into the market (i.e., timestamp), a trader may attempt to gain an undue advantage by splitting an order into multiple orders, or otherwise engage in a practice to enter multiple orders largely for the purpose of promoting the relative timestamp of an earlier order.

Such a practice may be deemed unacceptable by the market operator/exchange. Should all traders engage in such a practice, the advantage would be largely neutralised, but there would be unnecessary and excessive order message traffic flowing over the electronic network which could lead to a degradation in system performance. Accordingly, in a preferred embodiment of the invention, an algorithm is provided that is designed to seamlessly blend volume and time within a single matching process, but simultaneously to eliminate any incentive to enter multiple/split orders to gain an unfair advantage.

In a widely used conventional implementation of index weighting, the algorithm of Equation 5 is used.

In one preferred implementation of the algorithm of Equation 5, the time and volume weightings Wt and Wv are configured to be 1; the smoothing factor S is configured to be 1 and the offset C is configured to be 1.

$$g_n = \left(\frac{v_n}{\sum_{r=1}^{N} v_r}\right) \times \left(\frac{(N+1)-n}{\sum_{r=1}^{N} r}\right) \quad \text{Equation 9}$$

$$f_n = \frac{g_n}{\sum_{r=1}^{N} g_r} \quad \text{Equation 10}$$

The following example illustrates the preferred entry of five resting buy orders into the market and their expected allocation of an incoming matching sell order, based upon their volume and time entered into the market, and according to the algorithms of Equations 9 and 10 as configured above. In this example, all resting buy orders are of equal volume. As such, their volumes will have an equal bearing on their allocation; only their relative timestamps will influence the allocation. To illustrate the effect of splitting orders, in Tables 9-15, allocation factors are expressed as a percentage, i.e., resting order n will be allocated $f_n$ percent of an incoming matching order.

TABLE 9

| Time (n) | Trader | Volume ($v_n$) lots | Allocation Percentage ($f_n$) |
|---|---|---|---|
| 1 | AAA | 10 | 33% |
| 2 | BBB | 10 | 27% |
| 3 | CCC | 10 | 20% |

TABLE 9-continued

| Time (n) | Trader | Volume ($v_n$) lots | Allocation Percentage ($f_n$) |
|---|---|---|---|
| 4 | DDD | 10 | 13% |
| 5 | EEE | 10 | 7% |

As illustrated in Table 9, Trader AAA receives the greatest allocation for placing the first resting order into the order book. Trader DDD will receive the lowest allocation for being the last resting order.

However, if Trader DDD were to split the 10-lot order into a 6-lot order followed by four 1-lot orders, for example, the result would be as shown below in Table 10. The effect of the four one lot orders is that the initial 6-lot order is further towards the front of the book in relative terms, compared to the example above. With the relative timestamp effectively promoted, Trader DDD is able to engineer a greater overall allocation as demonstrated below:

TABLE 10

| Time (n) | Trader | Volume ($v_n$) lots | Allocation Percentage ($f_n$) |
|---|---|---|---|
| 1 | AAA | 10 | 30.0% |
| 2 | BBB | 10 | 26.7% |
| 3 | CCC | 10 | 23.3% |
| 4 | DDD | 6 | 12% |
| 5 | DDD | 1 | 1.7% |
| 6 | DDD | 1 | 1.3% |
| 7 | DDD | 1 | 1.0% |
| 8 | DDD | 1 | 0.7% |
| 9 | EEE | 10 | 3.3% |

It can be seen that the allocation Trader DDD receives for the 6-lot order is 12%, and 1.7%, 1.3%, 1.0% and 0.7% for the four remaining 1-lot orders respectively. The total allocation for the 10 lots is 12%+1.7%+1.3%+1.0%+0.7%=16.7%, which is an improvement compared to the 13% received if the order is not split.

As Trader DDD changes the manner in which the order is submitted, i.e., splits the order into multiple orders, the allocations of Traders AAA, BBB, CCC & EEE are also affected. If Trader DDD were to submit the order earlier or submit an order of greater volume, then the intended outcome would be for Trader DDD to receive a greater allocation as a reward for an earlier or bigger order relative to the other traders. However, if Trader DDD simply submits the same total volume at the same position in the order book (i.e., time) relative to the other orders, it is not the intended outcome for Trader DDD to receive a greater allocation, to the detriment of other traders, by splitting the order.

In order to address the issue described above, a new algorithm has been developed as a preferred embodiment of the present invention. In this preferred embodiment, the allocations to each trader are governed by the relative volume and time of the submission of their orders alone, and not the manner in which the order is submitted, i.e., by splitting the order into multiple orders.

This algorithm is illustrated by Equations 11, 12, 13, and 14, as shown below. For each resting order n (sorted in order of time entered into the order book, n=1 (first), n=N (last)) with volume $v_n$ lots in a total of N orders the allocation factor $f_n$ is calculated as follows:

$$f_n = \frac{(BV - LF_n)^{w+1} - (BV - LF_n - v_n)^{w+1}}{(BV)^{w+1}} \quad \text{Equation 11}$$

KEY—Parameters
N Number of Resting Buy (Sell) Orders Sorted by Time— each n=1 (first) to N (last)
Vn Volume of Each Resting Order n
w Weighting of Time Relative to Volume
fn Pro-rata Factor for Resting Buy (Sell) Order n
BV is the Book Volume or total volume of N orders eligible for matching:

$$BV = \sum_{r=1}^{N} v_r \quad \text{Equation 12}$$

$LF_n$ is the total volume of orders in front of each order n:

$$LF_n = \sum_{r=1}^{n-1} v_r \quad \text{Equation 13}$$

Equations 11, 12, and 13 may thus be combined as follows:

$$f_n = \frac{\left(\sum_{r=1}^{N} v_r - \sum_{r=1}^{n-1} v_r\right)^{w+1} - \left(\sum_{r=1}^{N} v_r - \sum_{r=1}^{n-1} v_r - v_n\right)^{w+1}}{\left(\sum_{r=1}^{N} v_r\right)^{w+1}} \quad \text{Equation 14}$$

W is the weighting of the time element of the algorithm relative to the volume element. In this method, a single weighting parameter is employed to blend the volume and time elements together. A higher weighting will give a greater allocation to earlier orders. A weighting of zero will mean the time an order is placed will have no bearing on how the algorithm calculates each order's allocation; consequently the allocation will be governed by the volume element only, i.e., algorithm will behave according to the volume factor set out in Equation 1 alone. When W=0, Equation 14 simplifies as shown below in Equation 15:

$$f_n = \frac{\left(\sum_{r=1}^{N} v_r - \sum_{r=1}^{n-1} v_r\right) - \left(\sum_{r=1}^{N} v_r - \sum_{r=1}^{n-1} v_r - v_n\right)}{\sum_{r=1}^{n} v_r} = \frac{v_n}{\sum_{r=1}^{N} v_r} \quad \text{Equation 15}$$

In the following example illustrated in Table 11, the weighting of time relative to volume W is configured to be 1. This configuration approximates the index weighting method of Equation 5 with volume and time weightings $W_t$ and $W_v$ both set to 1; and with the smoothing factor S and time offset C also set to 1. The structure of the order book is the same as the previous example:

TABLE 11

| Time (n) | Trader | Volume ($v_n$) lots | $LF_n$ | Allocation Percentage ($f_n$) |
|---|---|---|---|---|
| 1 | AAA | 10 | 0 | 36% |
| 2 | BBB | 10 | 10 | 28% |
| 3 | CCC | 10 | 20 | 20% |
| 4 | DDD | 10 | 30 | 12% |
| 5 | EEE | 10 | 40 | 4% |

Total Book Volume BV = 50 lots

If Trader DDD were to again split the 10-lot order, it can be seen in Table 12 below that the total allocation to Trader DDD remains unchanged. Accordingly, there is no rationale for splitting the original 10-lot order into multiple orders so as to gain an undue advantage:

TABLE 12

| Time (n) | Trader | Volume ($v_n$) lots | $LF_n$ | Allocation Percentage ($f_n$) |
|---|---|---|---|---|
| 1 | AAA | 10 | 0 | 36% |
| 2 | BBB | 10 | 10 | 28% |
| 3 | CCC | 10 | 20 | 20% |
| 4 | DDD | 6 | 30 | 8.16% |
| 5 | DDD | 1 | 36 | 1.08% |
| 6 | DDD | 1 | 37 | 1.00% |
| 7 | DDD | 1 | 38 | 0.92% |
| 8 | DDD | 1 | 39 | 0.84% |
| 9 | EEE | 10 | 40 | 4% |

Total Book Volume BV = 50 lots

When Trader DDD places the 10-lot order as a single order, the allocation is 12% of any incoming matching business. When the order is split into 6 lots, followed by 4 orders for 1 lot, the total allocation is 8.16%+1.08%+1.00%+0.92%+0.84%=12%. The allocation remains unchanged no matter how the combined 10 lots are entered. In the example illustrated in Table 13 below, the order is split into two 5-lot orders.

TABLE 13

| Time (n) | Trader | Volume ($v_n$) lots | $LF_n$ | Allocation Percentage ($f_n$) |
|---|---|---|---|---|
| 1 | AAA | 10 | 0 | 36% |
| 2 | BBB | 10 | 10 | 28% |
| 3 | CCC | 10 | 20 | 20% |
| 4 | DDD | 5 | 30 | 7% |
| 5 | DDD | 5 | 35 | 5% |
| 6 | EEE | 10 | 40 | 4% |

Total Book Volume BV = 50 lots

Hence, Trader DDD gets a total allocation of 7%+5%=12%. Accordingly, it may be seen that the total percentage allocations given to all traders in unaffected by the manner in which the order is submitted, i.e., as a single order or as multiple orders. As a consequence the incentive to split orders is eliminated.

In practice, through the use of this preferred embodiment of the invention, there is now a disincentive to split orders. If a trader submits an order intention as a series of multiple orders rather than a single order, there is the possibility that other orders from other traders will be interspersed with these multiple orders, thereby reducing the relative time priority of those orders that are interspersed with other traders' orders. A reduced time priority will give a reduced allocation. By contrast, when using the conventional algorithm, this risk is mitigated by the prospect of an overall greater allocation as a result of the submission of multiple orders.

In the following example as illustrated in Table 14, the weighting W is configured to be 2.

TABLE 14

| Time (n) | Trader | Volume ($v_n$) lots | $LF_n$ | Allocation Percentage ($f_n$) |
|---|---|---|---|---|
| 1 | AAA | 10 | 0 | 48.8% |
| 2 | BBB | 10 | 10 | 29.6% |
| 3 | CCC | 10 | 20 | 15.2% |
| 4 | DDD | 10 | 30 | 5.6% |
| 5 | EEE | 10 | 40 | 0.8% |

Total Book Volume BV = 50 lots

The higher weighting provides for an even greater percentage allocation for the earlier orders. In this example with a weighting of 2, Trader AAA receives a 48.8% allocation, compared with a 36% allocation when the weighting is set to 1. However, the allocation remains unaffected by the order splitting behavior of Trader DDD. If Trader DDD were to again split the 10 lot order, it can be seen in Table 15 below that the total allocation is unchanged:

TABLE 15

| Time (n) | Trader | Volume ($v_n$) lots | $LF_n$ | Allocation Percentage ($f_n$) |
|---|---|---|---|---|
| 1 | AAA | 10 | 0 | 48.8% |
| 2 | BBB | 10 | 10 | 29.6% |
| 3 | CCC | 10 | 20 | 15.2% |
| 4 | DDD | 6 | 30 | 4.2048% |
| 5 | DDD | 1 | 36 | 0.4376% |
| 6 | DDD | 1 | 37 | 0.3752% |
| 7 | DDD | 1 | 38 | 0.3178% |
| 8 | DDD | 1 | 39 | 0.2648% |
| 9 | EEE | 10 | 40 | 0.8% |

Total Book Volume BV = 50 lots

When Trader DDD places the 10-lot order as a single order, the allocation is 5.6% of any incoming matching business. When the order is split into 6 lots, followed by 4 orders for 1 lot, the total allocation is again 4.2048%+0.4376%+0.3752%+0.3176%+0.2648%=5.6%.

In the final step of the allocation process, the allocation $A_n$ for each resting order n against incoming order of tradable volume R lots is calculated as shown below in Equation 16:

$$A_n = \mathrm{MIN}(v_n f_n \times R) \quad \text{Equation 16}$$

The MIN( ) function ensures that the allocation given to resting order n does not exceed the volume of that resting order. Where $A_n$ produces a fractional value >1, $A_n$ is rounded down. Where $A_n$<1, $A_n$=1.

The resting orders are sequenced by allocation factor $f_n$. Orders are matched starting with the largest allocation factor until all tradable volume of the incoming order is fulfilled. Subsequent passes may be necessary if all tradable volume is not fulfilled on the first pass.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. For example, although the invention is primarily described with respect to trading futures contracts, the invention is equally applicable to trading other derivatives, options contracts, or cash-based financial instruments such as equities. The scope of the following claims is to be accorded the broadest interpretation so as to encompass all such modifications and equivalent structures and functions.

What is claimed is:

1. A system for facilitating trading of financial instruments in a market, the system comprising:

a server at which financial instruments are traded; and an interface in communication with the server, the interface being configured to receive entry of at least one of a buy order and a sell order, each buy order and each sell order having a price, a volume, and an entry time and relating to a respective financial instrument;

wherein the server is configured to receive a plurality of buy orders and sell orders from the interface, and to match buy orders relating to a first financial instrument and having a first price to sell orders relating to the first financial instrument and having the first price by, for each buy order and each sell order, using the volume and entry time to assign a weight of time relative to volume, and using the assigned weights to determine each match; and wherein the server is further configured to use each determined match to complete a respective trade, and wherein the server is further configured to determine each match according to a first algorithm which is expressible as $$f_n = \frac{\left(\sum_{r=1}^{N} v_r - \sum_{r=1}^{n-1} v_r\right)^{w+1} - \left(\sum_{r=1}^{N} v_r - \sum_{r=1}^{n-1} v_r - v_n\right)^{w+1}}{\left(\sum_{r=1}^{N} v_r\right)^{w+1}}$$

wherein each buy or sell order relating to the first financial instrument is assigned a value of n based on a time order of receipt; N=a total number of buy or sell orders relating to the first financial instrument eligible for matching; $v_n$=a volume of the $n^{th}$ buy or sell order; r=a whole number greater than or equal to 1 and less than or equal to N; $v_r$=a volume of the $r^{th}$ buy or sell order; w=the assigned weight of time relative to volume; and $f_n$=a resultant pro-rata factor for the $n^{th}$ buy or sell order.

2. The system of claim 1, wherein the server is further configured to assign the weights by using observable data relating to the market.

3. The system of claim 2, wherein the server is further configured to adjust at least one of the previously assigned weights by using observable data relating to the market.

4. A method of trading of financial instruments in a market, the method comprising the steps of:

receiving from a plurality of users entry of buy orders and sell orders, each buy order and each sell order having a price, a volume, and an entry time and relating to a respective financial instrument;

using a computer to assign a weight of time relative to volume to each buy order relating to a first financial instrument and having a first price based on its respective volume and entry time;

using a computer to assign a weight of time relative to volume to each sell order relating to the first financial instrument and having the first price based on its respective volume and entry time;

using a computer to match buy orders having the first price to sell orders having the first price using the assigned respective weights; and using the matched buy orders and sell orders to complete at least one trade, wherein the step of using a computer to match buy orders to sell orders further comprises using the assigned respective weights according to a first algorithm which is expressible as $$f_n = \frac{\left(\sum_{r=1}^{N} v_r - \sum_{r=1}^{n-1} v_r\right)^{w+1} - \left(\sum_{r=1}^{N} v_r - \sum_{r=1}^{n-1} v_r - v_n\right)^{w+1}}{\left(\sum_{r=1}^{N} v_r\right)^{w+1}}$$

wherein each buy or sell order relating to the first financial instrument is assigned a value of n based on a time order of receipt; N=a total number of buy or sell orders relating to the first financial instrument eligible for matching; $v_n$=a volume of the $n^{th}$ buy or sell order; r=a whole number greater than or equal to 1 and less than or equal to N; $v_r$=a volume of the $r^{th}$ buy or sell order; w=the assigned weight of time relative to volume; and $f_n$=a resultant pro-rata factor for the $n^{th}$ buy or sell order.

5. The method of claim 4, wherein the step of using a computer to assign the weight of time relative to volume to each buy order further comprises using a computer to assign the weight of time relative to volume to each buy order by using observable data relating to the market.

6. The method of claim 5, further comprising the step of, for at least one buy order, using a computer to adjust at least one of the previously assigned weights by using observable data relating to the market.

7. The method of claim 4, wherein the step of using a computer to assign the weight of time relative to volume to each sell order further comprises using a computer to assign the weight of time relative to volume to each sell order by using observable data relating to the market.

8. The method of claim 7, further comprising the step of, for at least one sell order, using a computer to adjust at least one of the previously assigned weights by using observable data relating to the market.

* * * * *